No. 806,978. PATENTED DEC. 12, 1905.
H. T. KINGSBURY.
INERTIA WHEEL TOY.
APPLICATION FILED MAY 16, 1904.

WITNESSES:
Albert Popkins
Grace P. Brereton

INVENTOR
Harry T. Kingsbury
BY
Sturtevant & Linley
ATTORNEYS

UNITED STATES PATENT OFFICE.

HARRY T. KINGSBURY, OF KEENE, NEW HAMPSHIRE.

INERTIA-WHEEL TOY.

No. 806,978.      Specification of Letters Patent.      Patented Dec. 12, 1905.

Application filed May 16, 1904. Serial No. 208,202.

*To all whom it may concern:*

Be it known that I, HARRY T. KINGSBURY, a citizen of the United States, residing at Keene, in the county of Cheshire, State of New Hampshire, have invented certain new and useful Improvements in Inertia-Wheel Toys, of which the following is a description, reference being had to the accompanying drawings and to the figures of reference marked thereon.

My invention relates to improvements in self-driven wheeled toys, and more particularly to that class which embody an inertia-wheel in which power may be stored to propel the toy.

The object of my invention is to improve the driving connection between the inertia-wheel and the running-wheels of the toy; and it consists in certain novel features of construction and combination of parts, which will be hereinafter described, and pointed out in the claims.

Figure 1:
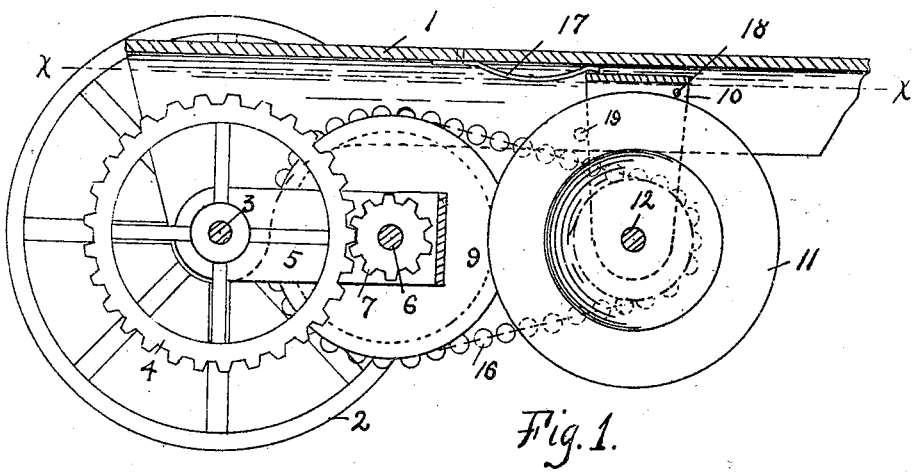
Figure 2:
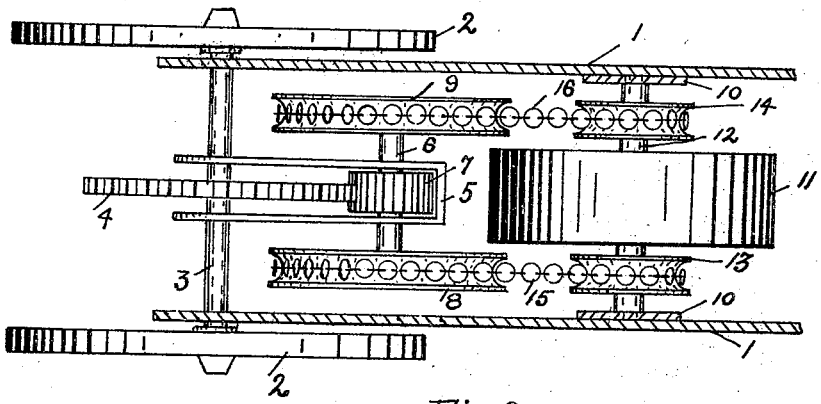

Figure 1 is a vertical section of a wheeled toy embodying my invention. Fig. 2 is a plan view taken on the line $x\ x$ of Fig. 1.

Only so much of the complete vehicle is illustrated in the drawings as to enable one skilled in the art to understand my invention.

In the preferred form of my invention I provide a frame 1, which has depending lugs serving to support the running-wheels 2 2 and 2' 2' of my wheeled toy. Said wheels 2 2 are rigidly connected to the shaft 3, which is provided intermediate its ends with a gear-wheel 4 fast thereon. Pivoted on the shaft 3 is a frame 5, and mounted in the outer end of the frame is a second shaft 6, carrying a gear-wheel 7, meshing with the gear-wheel 4. Rigidly secured on each end of the shaft 6 are grooved wheels 8 and 9. Pivotally secured to the frame 1 is a bracket 10, which has rotatably mounted therein the inertia-wheel 11. Said inertia-wheel is carried by a shaft 12. Fast on the shaft 12 are two grooved wheels 13 and 14, one on each side of the inertia-wheel and in line with the grooved wheels 8 and 9, respectively. A chain belt 15 passes over the grooved wheels 8 and 13 and transmits motion from one to the other. Likewise a chain belt 16 connects the grooved wheels 9 and 14. Rigidly secured to the frame 1 is a leaf-spring 17, which engages the bracket 10 and normally swings the bracket about its pivot 18, thereby placing a slight tension on the belts. A stop-pin 19 is fixed in the frame 1 and limits the forward movement of the bracket.

The operation of my device will be apparent from the above description. By turning the running-wheels either by hand or in any other suitable manner motion is given to the gear-wheel 4, which in turn is communicated to the gear-wheel 7 and grooved wheels 8 and 9 and through the chain belts to the inertia-wheel. It will be noted that when the turning force is applied to the running-wheels the frame 5, carrying the gear-wheel 7, tends to move downward, and thus tightens the chain belts as the shafts 3, 6, and 12 are normally substantially in a line, so that a movement of the shaft 6 in either direction will tighten the belts. The bracket is limited in its forward movement by the stop 19, and the belt becomes sufficiently tight to transmit the necessary power to give a high speed to the inertia-wheel. When the vehicle is propelling itself from the power stored in the inertia-wheel, the frame 5 rises, and the bracket supporting the inertia-wheel swings outward to keep a slight tension on the chain. If the vehicle is climbing a grade or meets with an obstruction, the frame 5 rises still further by the gear-wheel 7 climbing up the gear-wheel 4, and the bracket will be brought into contact with the stop 19 and the tension on the belts increased, so that it will be seen that the tension on the belt increases in accordance with the power transmitted.

Having thus described my invention, I claim as new and desire to secure by Letters Patent of the United States—

1. A wheeled toy, comprising in combination running-wheels, a shaft connecting said wheels, an inertia-wheel, a shaft supporting said inertia-wheel, a frame, a pulley carried by said frame, means for pivotally supporting said frame, a belt for transmitting power from said pulley to said inertia-wheel, movable bearings for supporting said inertia-wheel, means for moving said inertia-wheel outward to maintain a tension on said belt, means for limiting the inward movement of the inertia-wheel, and devices for operatively connecting said pulley to the running-wheels, said devices operating during movements of the wheels to turn said frame about its pivot and to increase the tension on the said belt; substantially as described.

2. A wheeled toy, comprising in combination running-wheels, a shaft connecting said wheels, an inertia-wheel, a shaft supporting said inertia-wheel, a frame, a pulley carried by said frame, means for pivotally supporting said frame, a belt for transmitting power from said pulley to said inertia-wheel, movable bearings for supporting said inertia-wheel, means for moving said inertia-wheel outward to maintain a tension on said belt, means for limiting the inward movement of the inertia-wheel, and devices for operatively connecting said pulley to the running-wheels, including a gear-wheel connected to said pulley and a gear-wheel on the shaft of the running-wheels meshing with said first-named gear, said devices operating during movements of the wheels to turn said frame about its pivot and to increase the tension on the said belt; substantially as described.

3. A wheeled toy comprising in combination a supporting-frame, running-wheels carried thereby, a pivoted bracket, a spring for forcing said bracket outward, a stop to limit the innerward movement thereof, an inertia-wheel and means for transmitting power between the inertia-wheel and the running-wheels, including a belt and devices operated from the running-wheels for increasing the tension on the belt as the power transmitted increases.

In testimony whereof I affix my signature in presence of two witnesses.

HARRY T. KINGSBURY.

Witnesses:
CHARLES C. STURTEVANT,
L. G. LITCHFIELD.